(12) United States Patent
Anderson et al.

(10) Patent No.: US 10,578,148 B1
(45) Date of Patent: Mar. 3, 2020

(54) CARABINER INCLUDING A REMOVABLE GATE SECTION CARRYING A BOTTLE OPENER FEATURE

(71) Applicant: FORD GLOBAL TECHNOLOGIES, LLC, Dearborn, MI (US)

(72) Inventors: Scott Culver Anderson, Commerce Township, MI (US); Miguel Angel Ramirez Basilio, Coacalco (MX); Maria Fernanda Medina Luna, Naucalpan (MX); Eric Bryan Arellano Aguilar, Azcapotzalco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/163,163

(22) Filed: Oct. 17, 2018

(51) Int. Cl.
*F16B 45/02* (2006.01)
*B67B 7/44* (2006.01)

(52) U.S. Cl.
CPC ............... *F16B 45/02* (2013.01); *B67B 7/44* (2013.01)

(58) Field of Classification Search
CPC .................................. F16B 45/02; B67B 7/44
See application file for complete search history.

(56) References Cited

U.S. PATENT DOCUMENTS

| | | | |
|---|---|---|---|
| 4,292,932 A | 10/1981 | Wooderson | |
| 6,223,372 B1 | 5/2001 | Barber | |
| D444,685 S | 7/2001 | Shenkel et al. | |
| 6,253,713 B1 | 7/2001 | Giedeman, III et al. | |
| D449,438 S | 10/2001 | Simond | |
| D475,591 S | 6/2003 | Luquire | |
| 7,469,870 B2 | 12/2008 | Brandin et al. | |
| 7,683,790 B2 | 3/2010 | Luquire | |
| 8,162,276 B2 | 4/2012 | Fathi et al. | |
| 9,427,858 B2 | 8/2016 | Duncan et al. | |
| D772,029 S | 11/2016 | Spater | |
| D773,911 S * | 12/2016 | Louis | D8/34 |
| 9,797,432 B2 | 10/2017 | Inkavesvaanit | |
| D811,838 S | 3/2018 | Bard | |
| 9,964,138 B2 * | 5/2018 | Codega | F16B 45/02 |
| D850,227 S | 6/2019 | Spater | |
| 2005/0076742 A1 | 4/2005 | Yurek, Jr. et al. | |
| 2006/0150341 A1 | 7/2006 | Gary | |
| 2009/0158899 A1 | 6/2009 | Eisenbraun | |

(Continued)

FOREIGN PATENT DOCUMENTS

| CN | 203754386 U | 8/2014 |
|---|---|---|
| GB | 2473489 A | 3/2011 |

OTHER PUBLICATIONS

"Ahhh . . . -S-Biner"; Nite Ize Inc; https://www.niteize.com/product/S-Biner-Ahhh.asp; pp. 1-4; printed Sep. 6, 2018.

(Continued)

*Primary Examiner* — Robert Sandy
*Assistant Examiner* — David M Upchurch
(74) *Attorney, Agent, or Firm* — Vichit Chea; King & Schickli, PLLC

(57) ABSTRACT

A carabiner includes a hook section, a gate section, a pivot connecting the gate section to the hook section and a bottle opener feature carried on the gate section. The bottle opener feature includes first and second lugs that may be utilized to remove a bottle cap from a bottle when the gate section is removed from the hook section of the carabiner.

8 Claims, 8 Drawing Sheets

(56) References Cited

U.S. PATENT DOCUMENTS

2014/0102259 A1      4/2014   Albrecht et al.
2015/0257440 A1      9/2015   Fischer
2016/0341239 A1*    11/2016   Inkavesvaanit ......... F16B 45/02
2018/0015604 A1*     1/2018   Berman .................... B25F 1/04

OTHER PUBLICATIONS

English Machine Translation of CN203754386U dated Aug. 6, 2014.
"Beer Soda Bottle Opener with Carabiner Clip"; DX Deal Extreme; https://www.dx.com/p/beer-soda-bottle-opener-with-carabiner-clip-black-55829#.W8eO3fYpCM9; pp. 1-4, printed on Aug. 16, 2018.
Office Action dated Jun. 28, 2019 for U.S. Appl. No. 16/203,193, filed Nov. 28, 2018.

* cited by examiner

CARABINER INCLUDING A REMOVABLE GATE SECTION CARRYING A BOTTLE OPENER FEATURE

TECHNICAL FIELD

This document relates generally to the connector field and more particularly, to a new and improved carabiner wherein the gate section thereof is removable and incorporates a bottle opener feature that may be utilized to remove a bottle cap from a bottle.

BACKGROUND

A carabiner is a well-known type of a connector. That carabiner usually includes a hook section and a gate section that usually forms a D-shaped or oblong ring. The gate section is spring-hinged to the hook section that may be pivoted open to allow access to the hook of the hook section and then pivoted closed to contain an attachment within the carabiner.

Carabiners may be utilized for a number of different applications in various environments. For example, a carabiner may be incorporated into a motor vehicle to act as a tie-down for different items in a cargo compartment such as the cargo area behind the rear seat of a sport utility vehicle. In such an embodiment the carabiner may be mounted to the floor or sidewall trim or rear seat defining the storage compartment.

This document relates to a new and improved carabiner wherein the gate incorporates a bottle opener feature. That gate section may be removed and then utilized to conveniently and effortlessly remove the bottle cap from a bottle. Accordingly, this allows for dual function for the benefit of the user.

SUMMARY

In accordance with the purposes and benefits described herein, a new and improved carabiner is provided. That carabiner comprises a hook, a gate section, a pivot connecting the gate section to the hook section and a bottle opener feature carried on the gate section.

That bottle opener feature may include a first lug and a second lug. The pivot may include a first trunnion carried on the hook section and a first gudgeon carried on the gate section. The first trunnion is received in the first gudgeon in order to allow pivoting and movement of the gate section with respect to the hook section.

The gate section may include a cantilever spring. The cantilever spring carries a second trunnion and the hook section includes a second gudgeon. The second trunnion may be received in the second gudgeon to thereby provide a spring action to the gate section biasing the gate section toward a closed position so that the hook section and gate section form a continuous ring securely holding a line or attachment feature passing through the ring.

The second lug of the bottle opener feature may be carried on the cantilever spring. Further, the second trunnion may be positioned between the first lug and the second lug of the bottle opener feature.

In any of the possible embodiments of the new and improved carabiner, an icon may be provided on the gate section. That icon suggests or indicates to the user that the gate section may be utilized as a bottle opener.

In accordance with an additional aspect, a new and improved method is provided of opening a bottle. That method may comprise the steps of: (a) removing a gate section from a hook section of a carabiner, (b) positioning a bottle opener feature carried on the gate section into engagement with a bottle cap on the bottle and (c) prying the bottle cap off of the bottle using the gate section.

The method may further include the step of reconnecting the gate section to the hook section of the carabiner after prying the bottle cap off of the bottle.

More specifically describing the method, the positioning step may include inserting the bottle cap between a first lug and a second lug of the bottle opener feature. Further, the prying step may include using the gate section as a lever to assert an opening force onto the bottle cap.

In the following description, there are shown and described several preferred embodiments of the new and improved carabiner as well as the related method of opening a bottle. As it should be realized, the carabiner is capable of other, different embodiments and their several details are capable of modification in various, obvious aspects all without departing from the carabiner and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the carabiner as well as the related method of opening a bottle and together with the description, serve to explain certain principles thereof. In the drawing figures.

Figure 5A:
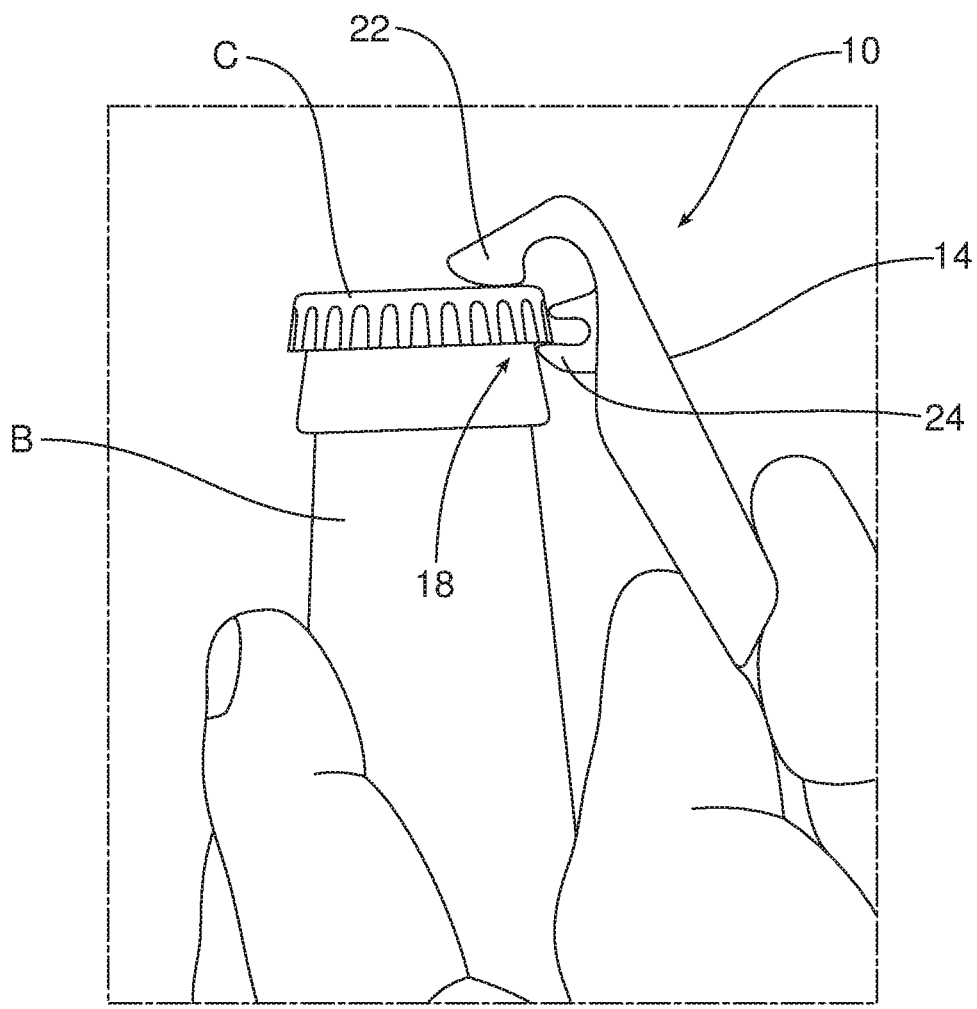
Figure 5B:
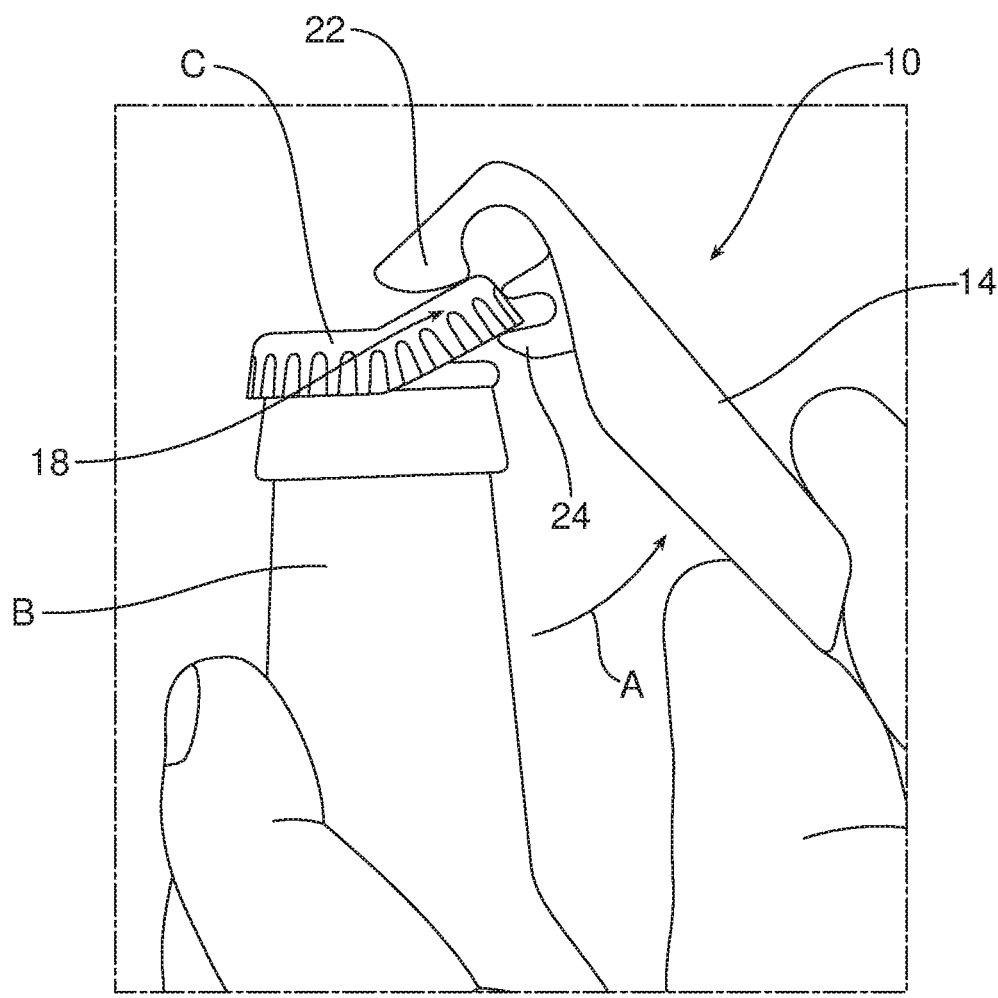

FIGS. 5A-5B are side elevational views illustrating how the gate section of the carabiner is utilized to remove a bottle cap from a bottle. FIG. 5A illustrates how the bottle opener feature on the gate section is positioned over the bottle cap. FIG. 5B illustrates how the gate section is then used as a lever to pry the bottle cap from the bottle.

Reference will now be made in detail to the present preferred embodiments of the carabiner and the related method of removing a bottle cap from a bottle, examples of which are illustrated in the accompanying drawing figures.

DETAILED DESCRIPTION

Reference is now made to the drawing figures illustrating the new and improved carabiner 10. That carabiner includes a hook section 12, a gate section 14 and a pivot, generally designated by reference numeral 16, connecting the gate section to the hook section. A bottle opener feature, generally designated by reference numeral 18 is carried on the gate section 14.

Figure 1:
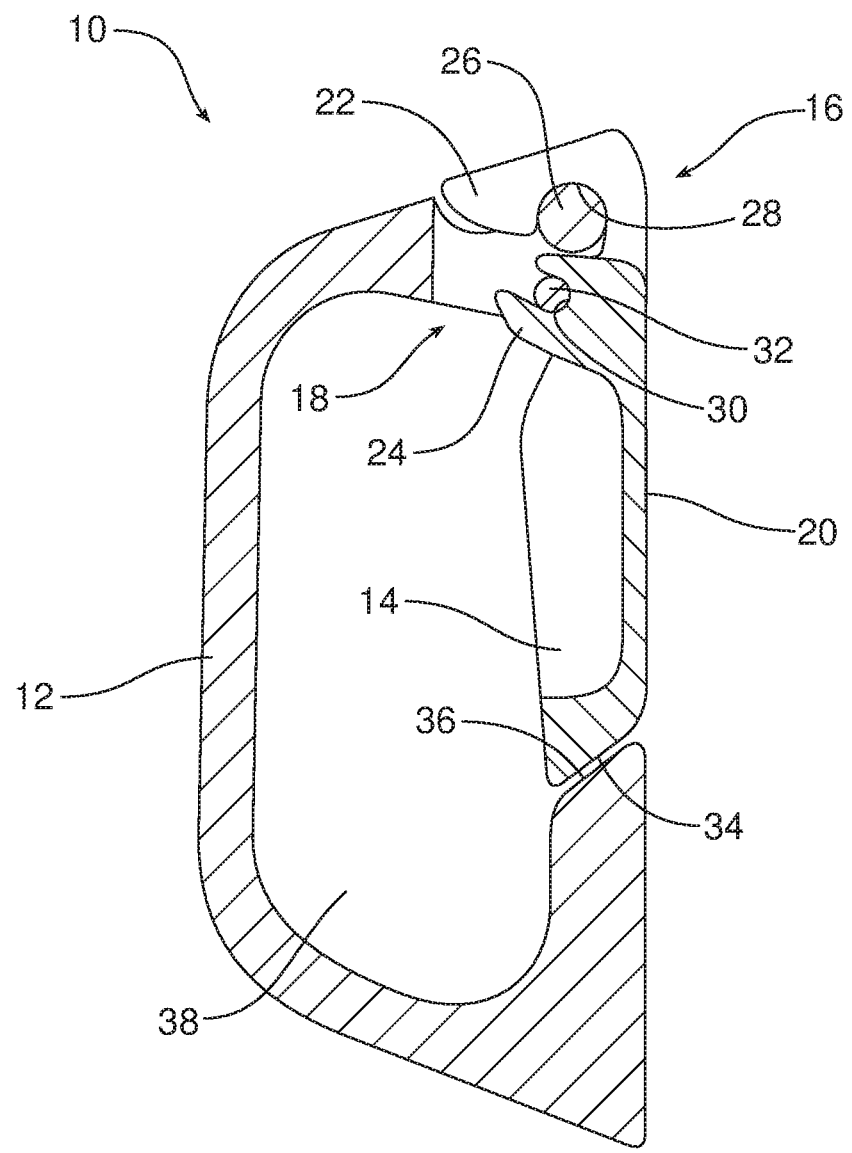
FIG. 1 is a detailed cross sectional view of the carabiner showing the hook section and the gate section with the gate section illustrated in the closed position.
Figure 2:
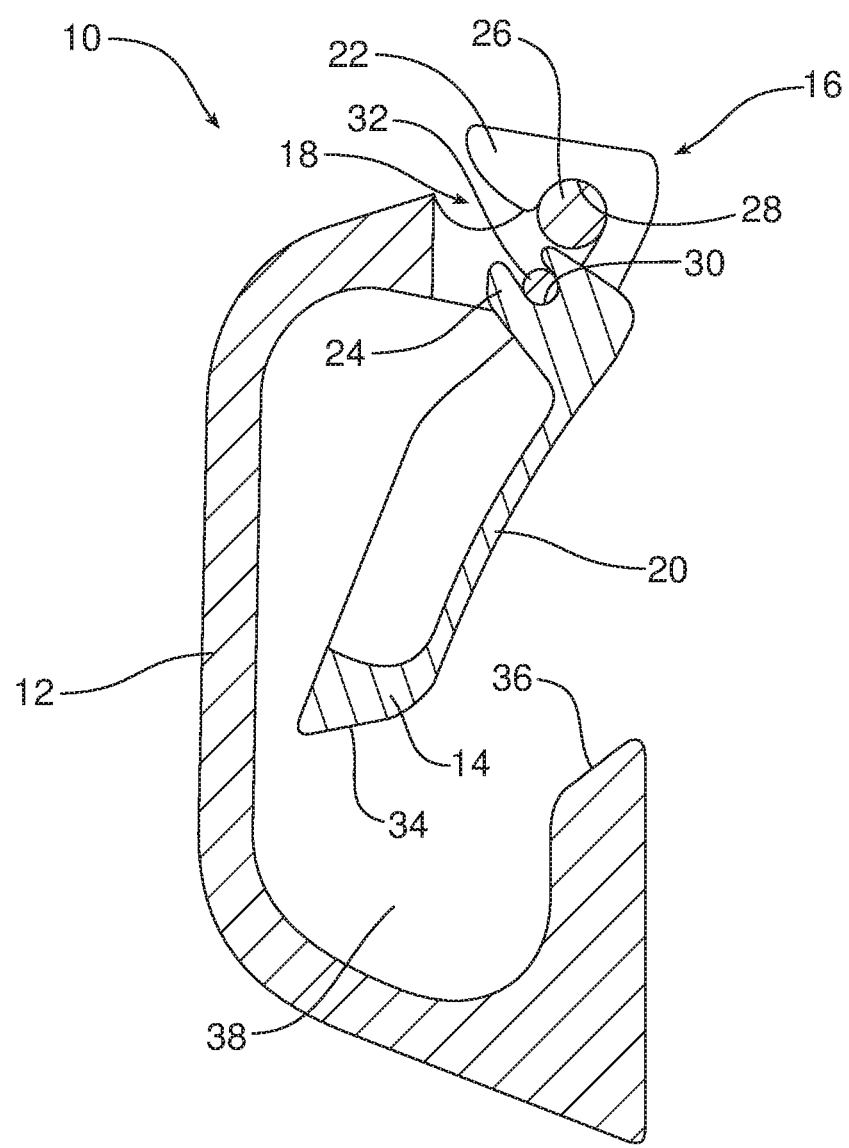
FIG. 2 is a view similar to FIG. 1 but illustrating the gates section in an open position.

As illustrated in FIGS. 1 and 2, the gate section 14 is displaceable about the pivot 16 between the closed position illustrated in FIG. 1 and the fully opened position illustrated in FIG. 2. More particularly, the gate section 14 includes an integral cantilever spring 20 that tends to bias the gate section toward the closed position illustrated in FIG. 1. The hook section 12 and the gate section 14 may be made from a number of different materials including, but not necessarily limited to, metal, plastic, aluminum, acrylonitrile butadiene styrene (ABS) filled plastic and combinations thereof.

Figure 3A:
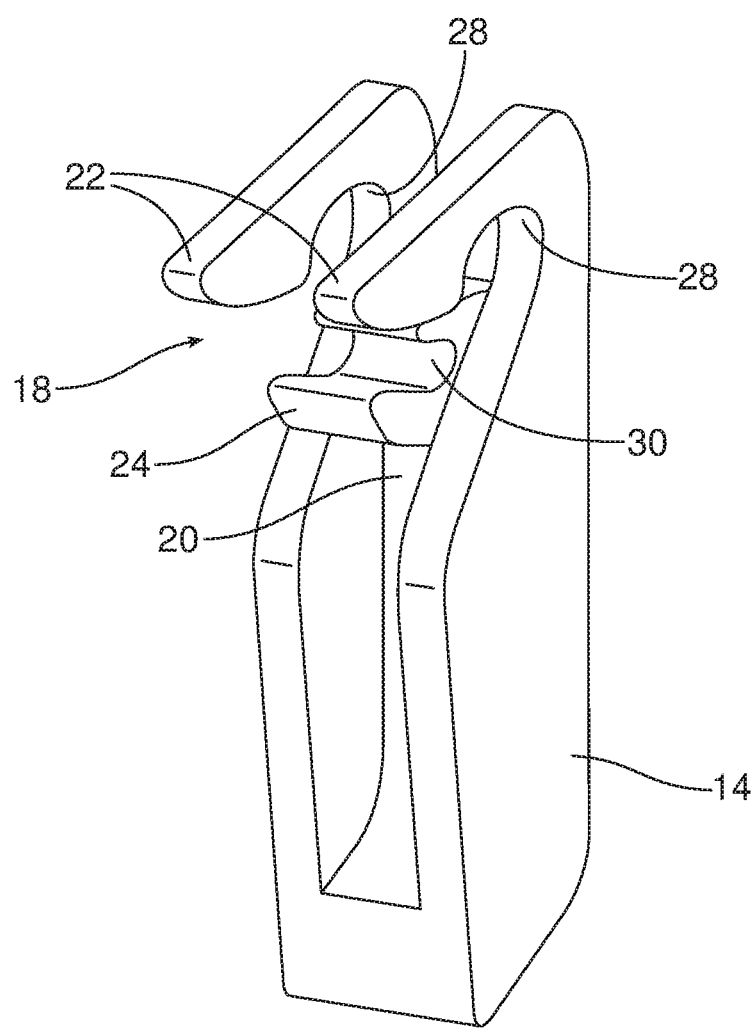
FIG. 3A is a detailed perspective view of the bottle opener feature carried on the gate section.
Figure 3B:
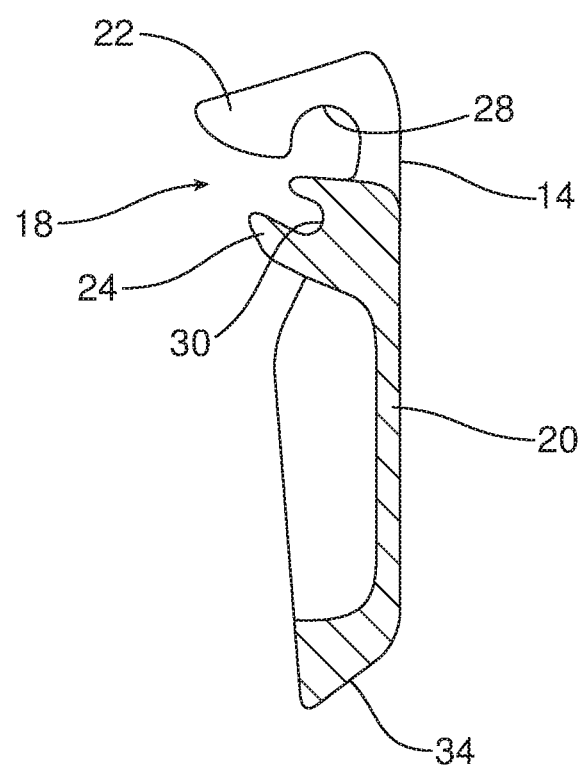
FIG. 3B is a detailed perspective view illustrating the cantilever spring of the gate section.

As best illustrated in FIG. 3A, the bottle opener feature 18 includes a first lug 22 and a second lug 24. The second lug 24 is carried on the cantilever spring 20.

The pivot 16 includes a first trunnion 26 carried on the hook section 12 and a first gudgeon 28 carried on the gate section 14. When the gate section 14 is properly connected to the hook section 12, the first trunnion 26 is received and held in the first gudgeon 28.

The cantilever spring 20 carries a second gudgeon 30. The hook section 12 includes a second trunnion 32. When the gate section 14 is properly connected to the hook section 12, the second trunnion 32 is received and held in the second gudgeon 30. As best illustrated in FIG. 3A, in the illustrated embodiment, the second trunnion 32 is positioned between the first lug 22 and the second lug 24 of the bottle opener feature 18. In fact, in the illustrated embodiment, the second lug 24 forms a wall or jaw of the second gudgeon 30.

More particularly, as best illustrated in FIG. 3A, the second gudgeon 30 is provided at the distal end of the cantilever spring 20. When the gate section 14 is displaced to the open position illustrated in FIG. 2, the cantilever spring 20 is displaced slightly (bends at its base 33) as the gate section 14 pivots about the first trunnion 26. The displaced cantilever spring 20 provides a biasing force that tends to bias the gate section 14 back to the closed position wherein the distal end 34 of the gate section is juxtaposed to the end 36 of the hook section 12 so that the hook section 12 and gate section 14 provide a continuous body outlining and closing the center opening 38 of the carabiner 10.

Figure 3C:
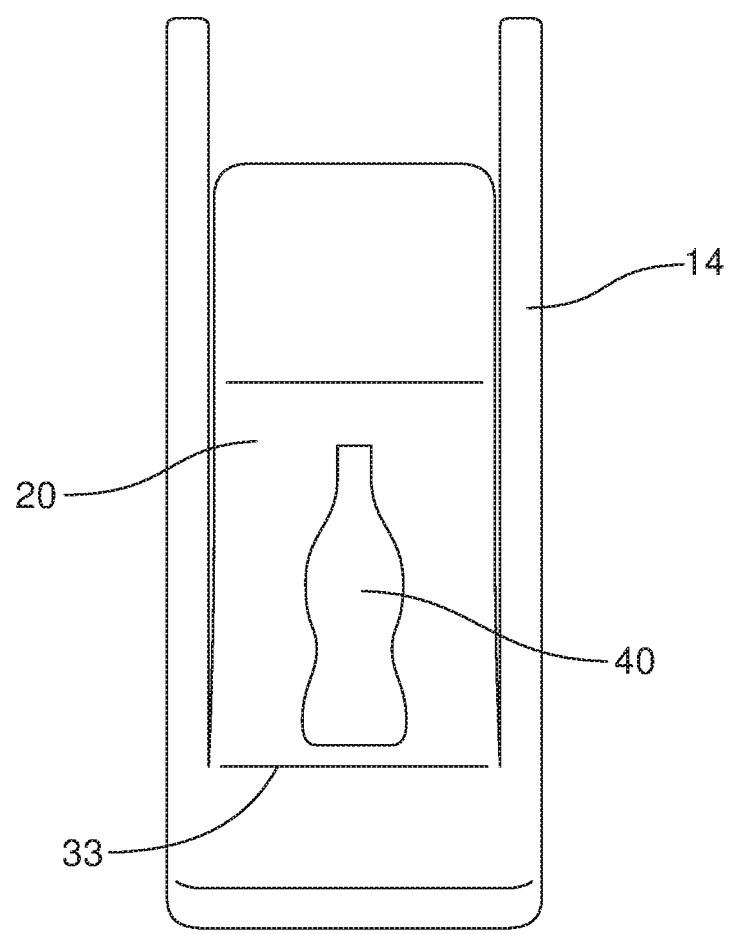
FIG. 3C is a detailed front elevational view of the gate section also illustrating the cantilever spring.

As illustrated in FIG. 3C, an icon 40 may be provided on the front face of the hook section 12. In the illustrated embodiment, the icon 40 is shaped like a bottle. It should be appreciated that the icon 40 may assume any shape suggestive of or indicating that the gate section 14 may be utilized as a bottle opener to remove a bottle cap C from a bottle B as illustrated in FIGS. 5A and 5B and described in greater detail below.

Figure 4:
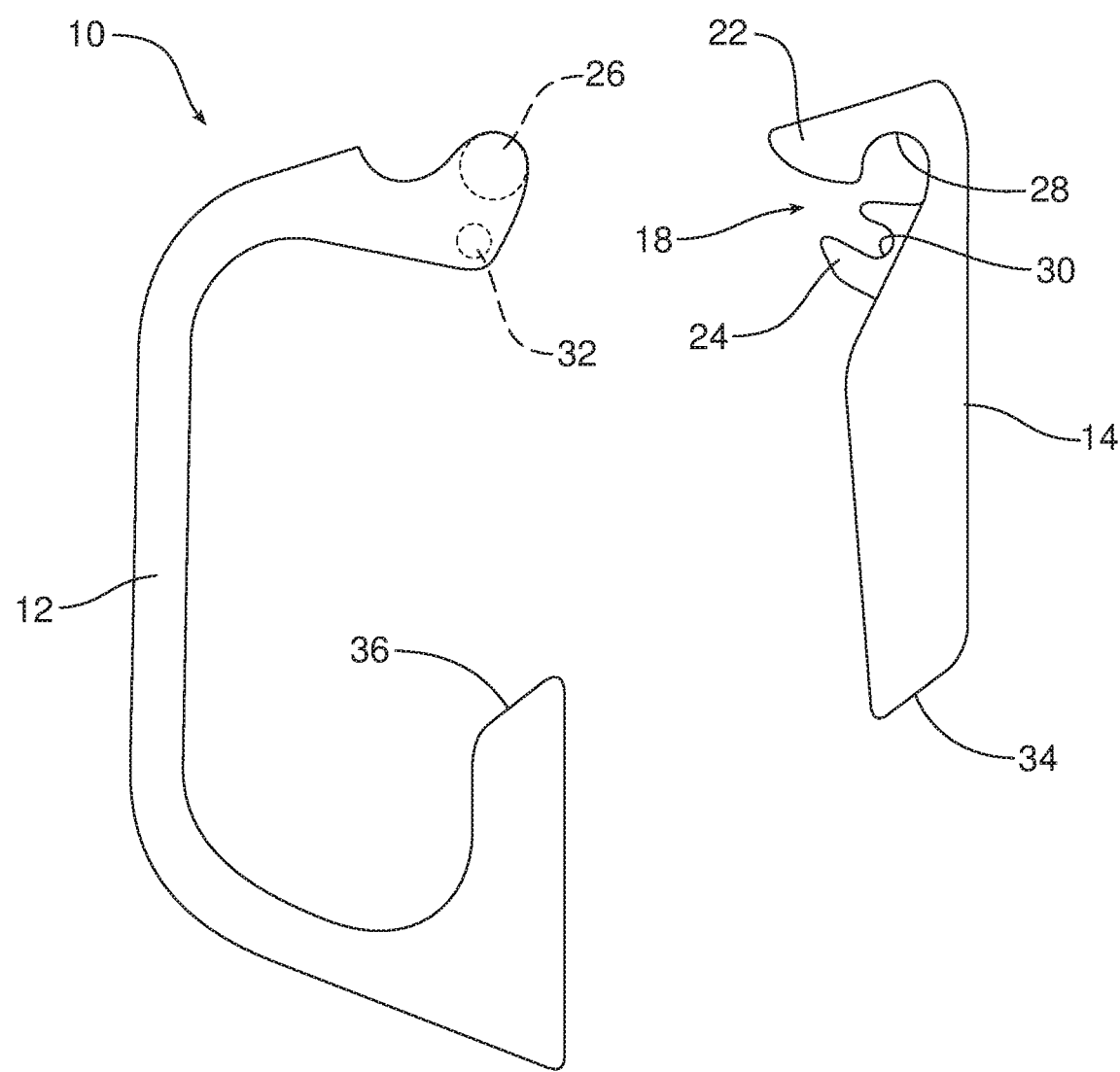
FIG. 4 is a side elevational view illustrating the gate section removed from the hook section.

Consistent with the above description, a new and improved method of removing a bottle cap C and opening a bottle B will now be described with reference to FIGS. 4, 5A and 5B. That method may be broadly described as including the steps of removing the gate section 14 from the hook section 12 of the carabiner 10 (see FIG. 4), positioning the bottle opener feature 18 carried on the gate section into engagement with the bottle cap C on the bottle B (see FIG. 5A) and prying the bottle cap off of the bottle using the gate section (see FIG. 5B).

More particularly, the positioning step may include inserting the bottle cap C between the first lug 22 and the second lug 24 of the bottle opener feature 18. The prying step may include using the gate section 14 as a lever (note action arrow A of FIG. 5B) in order to assert an opening force onto the bottle cap C allowing easy and convenient removal of the bottle cap C from the bottle B.

After removing the bottle cap C from the bottle B, the gate section 14 may be reconnected to the hook section 12 of the carabiner 10. The removal of the gate section 14 from the hook section 12 and the reconnection of the gate section to the hook section may be accomplished through a simple snapping action between the first trunnion 26 and the first gudgeon 28 and the second trunnion 32 and the second gudgeon 30.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A carabiner, comprising:
   a hook section;
   a gate section including a cantilever spring;
   a pivot connecting said gate section to said hook section wherein said pivot includes a first trunnion carried on said hook section and a first gudgeon carried on said gate section, said first trunnion being received in said first gudgeon; and
   a bottle opener feature carried on said gate section wherein said bottle opener feature includes a first lug and a second lug.

2. The carabiner of claim 1, wherein said gate section includes an icon indicating use of said gate section as a bottle opener.

3. The carabiner of claim 1, wherein said cantilever spring carries a second gudgeon and said hook section includes a second trunnion, said second trunnion being received in said second gudgeon.

4. The carabiner of claim 3, wherein said second lug is carried on said cantilever spring.

5. The carabiner of claim 4, wherein said second gudgeon is positioned between said first lug and said second lug.

6. The carabiner of claim 1, wherein said cantilever spring carries a second gudgeon and said hook section includes a second trunnion, said second trunnion being received in said second gudgeon.

7. The carabiner of claim 6, wherein said second lug is carried on said cantilever spring.

8. The carabiner of claim 7, wherein said second gudgeon is positioned between said first lug and said second lug.

* * * * *